(12) United States Patent
Soto Hernandez et al.

(10) Patent No.: US 12,558,754 B2
(45) Date of Patent: Feb. 24, 2026

(54) METHOD AND DEVICE FOR DRY TREATMENT OF METAL SURFACES BY MEANS OF ELECTRICALLY ACTIVE SOLID PARTICLES

(71) Applicants: DRYLYTE, S.L., Barcelona (ES); STEROS GPA INNOVATIVE, S.L., Barcelona (ES)

(72) Inventors: Marc Soto Hernandez, Sant Fost de Campsentelles (ES); Marc Sarsanedas Gimpera, Olot (ES); Pau Romagosa Calatayud, Les Borges del Camp (ES); Miguel Francisco Perez Planas, Cardedeu (ES); Edurne Galindo Sesé, Gavà (ES); Laia Fontelles Batalla, La Pobla de Segur (ES)

(73) Assignees: DRYLYTE, S.L., Barcelona (ES); STEROS GPA INNOVATIVE, S.L., Barcelona (ES)

( * ) Notice: Subject to any disclaimer, the term of this patent is extended or adjusted under 35 U.S.C. 154(b) by 763 days.

(21) Appl. No.: 17/590,446

(22) Filed: Feb. 1, 2022

(65) Prior Publication Data

US 2022/0161382 A1 May 26, 2022

Related U.S. Application Data

(63) Continuation of application No. PCT/ES2020/070499, filed on Jul. 31, 2020.

(30) Foreign Application Priority Data

Aug. 1, 2019 (ES) ................................. P201930716
Aug. 1, 2019 (ES) ................................. P201930717

(51) Int. Cl.
*B24B 1/00* (2006.01)
*C09G 1/02* (2006.01)
(Continued)

(52) U.S. Cl.
CPC ................ *B24B 1/002* (2013.01); *C09G 1/02* (2013.01); *C23F 1/10* (2013.01); *C25F 3/02* (2013.01);
(Continued)

(58) Field of Classification Search
None
See application file for complete search history.

(56) References Cited

U.S. PATENT DOCUMENTS 3,523,834 A    8/1970   Hewins
3,533,928 A    10/1970  Inoue
(Continued)

FOREIGN PATENT DOCUMENTS

CN    109415839 A    3/2019
CN    109551374 A    4/2019
(Continued)

OTHER PUBLICATIONS

Machine translation of WO2018172586. (Year: 2018).*
(Continued)

*Primary Examiner* — Brian W Cohen
(74) *Attorney, Agent, or Firm* — Edell, Shapiro & Finnan, LLC

(57) ABSTRACT

Methods and devices for treatment of metal surfaces by means of electrically active solid particles that include a step of contact of the solid particles with the electrode of an electric source, a step of shooting the particles towards the metal surface to be treated and a step of transmission of electric charge of the particles on the metal surface to be treated. The transmission of the electricity between the electric source and the metal surface during the step of shooting preferably is by net charge of the particles or by electric conductivity by contact or by electric conductivity by means of voltaic arches. The current applied to the
(Continued)

electrode is preferably a DC or a current that contains positive sections and negative sections.

10 Claims, 5 Drawing Sheets

(51) Int. Cl.

| | |
|---|---|
| *C23F 1/10* | (2006.01) |
| *C25F 3/02* | (2006.01) |
| *C25F 3/06* | (2006.01) |
| *C25F 3/16* | (2006.01) |
| *C25F 3/22* | (2006.01) |
| *C25F 3/24* | (2006.01) |

(52) U.S. Cl.
  CPC .................. *C25F 3/06* (2013.01); *C25F 3/16* (2013.01); *C25F 3/22* (2013.01); *C25F 3/24* (2013.01)

(56) References Cited

U.S. PATENT DOCUMENTS

| | | | | |
|---|---|---|---|---|
| 3,620,953 | A * | 11/1971 | Kiyoshi et al. | ........... C25F 7/00 204/201 |
| 5,795,626 | A | 8/1998 | Gabel et al. | |
| 6,074,284 | A | 6/2000 | Tani et al. | |
| 6,156,187 | A | 12/2000 | Akagi et al. | |
| 6,739,953 | B1 | 5/2004 | Berman et al. | |
| 6,957,511 | B1 | 10/2005 | Leigh et al. | |
| 7,935,242 | B2 * | 5/2011 | Klein | ............... H01L 21/67075 205/640 |
| 10,975,491 | B2 * | 4/2021 | Sarsanedas Millet | .... C25F 3/24 |
| 2003/0178320 | A1 | 9/2003 | Liu et al. | |
| 2007/0017818 | A1 | 1/2007 | Emesh et al. | |
| 2014/0076739 | A1 | 3/2014 | Andreacchi | |
| 2017/0144239 | A1 * | 5/2017 | Luo | ......................... B23H 5/08 |
| 2018/0029021 | A1 | 2/2018 | Boal et al. | |
| 2018/0298518 | A1 * | 10/2018 | Sarsanedas Millet | ...................... B24B 31/003 |
| 2018/0361529 | A1 | 12/2018 | Liang et al. | |
| 2019/0099854 | A1 | 4/2019 | Suen et al. | |

FOREIGN PATENT DOCUMENTS

| | | | | |
|---|---|---|---|---|
| CN | 109735891 | A | 5/2019 | |
| DE | 2031833 | A1 | 12/1971 | |
| EP | 0339464 | A1 | 11/1989 | |
| EP | 3372711 | A1 | 9/2018 | |
| ES | 2604830 | A1 * | 3/2017 | .......... B24B 31/003 |
| ES | 2721170 | A1 * | 7/2019 | ............. B01J 39/05 |
| JP | S5-1134994 | A | 11/1976 | |
| JP | H0259216 | A | 2/1990 | |
| JP | 02-292126 | A | 12/1990 | |
| JP | 2001-150243 | A | 6/2001 | |
| JP | 2002093758 | A | 3/2002 | |
| JP | 2008196047 | A | 8/2008 | |
| JP | 2019063887 | A | 4/2019 | |
| KR | 10-2018-0072982 | A | 7/2018 | |
| RU | 2694941 | C1 | 7/2019 | |
| WO | 2013143115 | A1 | 10/2013 | |
| WO | 2016/193736 | A1 | 12/2016 | |
| WO | 2018172586 | A1 | 9/2018 | |

OTHER PUBLICATIONS

English Translation of International Search Report in PCT/ES2020/070499, mailed Dec. 11, 2020, 4 pages.

Extended European Search Report in related European Application No. 17788863.3, dated Jun. 14, 2019, 16 pages.

International Search Report in corresponding PCT Application No. PCT/ES2017/070247, mailed Aug. 9, 2017, 5 pages.

Product Data Sheet, "Amberlite 252RF H", Rohm and Haas Company, Jul. 1997, 2 pages.

\* cited by examiner

METHOD AND DEVICE FOR DRY TREATMENT OF METAL SURFACES BY MEANS OF ELECTRICALLY ACTIVE SOLID PARTICLES

CROSS-REFERENCE TO RELATED APPLICATIONS

This application relates to and claims the benefit and priority to International Application No. PCT/ES2020/070499, filed Jul. 31, 2020, which claims the benefit and priority to Spanish Patent Application Nos. P201930716 and P201930717, each filed on Aug. 1, 2019.

OBJECT OF THE INVENTION

The object of the invention is a method for treating or polishing metal surfaces by shooting electrically active solid particles on the part to be polished from an electrode connected to a power source. This method allows to carry out dry polishing of metal surfaces without having to introduce the surface to be treated in a basin, which allows treating surfaces that, due to their characteristics of size, location etc., formerly could not be treated, such as large elements, unmovable elements, etc. This method possesses advantages and characteristics that mean a significant novelty with respect to the current state-of-art.

Are likewise the object of the invention, the devices used to treat metal surfaces by means of shooting electrically active solid particles from an electrode of a power source to the metal surface to be treated. These devices allow to treat metal surfaces from a given distance without having to introduce the surface within a basin. This allows the treatment of surfaces of large elements, unmovable elements, etc. These devices can be designed to treat large elements by means of robotic arms, for their use in cabins, for their in-line use in production lines, for their use in portable or stand-alone equipment. These devices possess advantages and means a significant progress on the current state-of-the-art that is being detailed below.

FIELD OF THE INVENTION

The field of this invention is the industrial sector engaged in the treatment of metal surfaces. Namely, the industrial sector engaged in polishing metal surfaces, with applications in fields such as, for example, aeronautics, construction, automation, medicine, sintered laser, among many other fields of application.

BACKGROUND OF THE INVENTION

Currently, polishing systems by shooting of abrasive particles on the surface to be treated are present in the market. The particles are forcefully impelled towards the surface, producing a polishing effect in proportion to the force of the impact. The polishing systems by shooting abrasive particles has a series of drawbacks. The polishing systems by shooting abrasive particles provoke a lack of homogeneity on the surface applied to because the abrasion is related with the pressure between the surface and the particles. The parts having a greater exposure sustain more abrasive action which generates a loss of definition of the vertices and edges. This limits their application in cases that require accurateness or keeping a sharp edge. Also, the polishing systems by shooting abrasive particles provoke inclusion of the same abrasive particles on the metal surface, reducing the properties of the surface as for durability, chemical resistance and traction. There are also significant respiratory health risks associated with the said polishing systems by shooting abrasive particles, using abrasive particles, as well for the abrasive particles as for the suspended dust and microparticles generated during the process.

On the other hand, there exist the dry electropolishing systems disclosed in ES2604830(A1) as a "method to smooth and polish metal through ions carriage by means of free solid bodies". This method is based on introducing and rubbing the part to be treated in a medium composed of solid particles capable to carry out ionic carriage while an electrical potential is applied between the part and the counter electrode. This system of dry electropolishing system allows to obtain surfaces having a low roughness and spectacular finishes. In addition, this system does not significantly modify the vertices nor corner edges in the object to be polished. The dry electropolishing systems have several drawbacks among which is to be pointed out the fact that it is unworkable when it is dealt with large-sized parts, such as an aircraft wing and the fact that it is not possible to apply it to treat unmovable elements, such as for example building elements, among others.

The dry polishing method of metal surfaces by shooting electrically active particles, allows to join the spectacular finishes of the dry electropolishing system with the advantages of polishing by means of shooting abrasive particles, enlarging the field of application of the former and reducing the drawbacks of the later. However, to achieve this objective, it is necessary to overcome in an unobvious manner several hindrances present such as the nature of the solid particles to use, their compaction or the type of electric current.

SUMMARY

The metal surfaces dry polish method and device by means of shooting electrically active particles possess a series of identifying advantages and characteristics that are detailed below.

The term electrically active solid particles, refers in this text to particles that can be electrically charged, that can conduct electricity or simultaneously both characteristics to a certain extent.

The term shooting of particles, is understood in this text in the largest sense of any method or system by which the particles reach the surface to be treated, regardless of whether the impelling force has been gravity, the fluid flow, compressed gas, electrostatic forces or the centrifugal force, among others.

The term electric source, is understood in this text as any element capable to supply electric energy to the electrically active solid particles. The electric source provides electric energy to the solid particles. The electric current applied by the electric source can be AC, DC or pulsed current. Preferably, the electric source includes a system that allows to control the voltage and intensity applied.

The essential steps that define the method and the device object of the invention are:

Contact of an electrode of the electric source with the electrically active solid particles.

Shooting of the electrically active solid particles of the device on the metal surface.

Contact of the electrically active solid particles with the metal surface.

The minimum elements defining the device object of the invention are:

A set of electrically active solid particles

An electric source with an electrode that transmits electric charge to the electrically active solid particles Means for shooting the electrically active solid particles on the metal surface to be treated.

A nozzle through which the electrically active solid particles go out of the device.

The interactions that exist between these minimum elements are as follows. The electrically active particles contact an electrode of the electric source and this later transmits electric charge to them. From the electrode, the particles move towards the metal surface to be treated where they contact and transmit part of the electric energy. This contact generates redox process on the metal surface producing a polishing effect. In FIG. 1, the drawing of a prototype is shown as an example.

Due to the electric nature of the process, the surface to be treated shall be conductive, preferably metallic. This includes surfaces of non-conductive materials, such as plastic that sustained a metalizing process.

The transmission of the electric charge from an electrode to the surface to be treated by means of a particles flow not described in the literature, as we are aware, up to this date. Three possible mechanisms of transmission of electric charge have been conceptualized, these and a variety of intermediate or derived situations occurring from them, simultaneously:

1) by net charge of the particles,
2) by electric conductivity by contact, and
3) by electric conductivity by means of voltaic arch or ionized gas.

A schematic representation of these mechanisms can be seen in FIG. 2.

Depending on the system controllable parameters, an appropriate mechanism for treating the surface can be selected. The controllable parameters are electric attributes (e.g. charge, current), the type of particles, the shooting type and the environment.

The mechanism of transmission of electric charge by particles with net charge occurs in low compaction conditions. That is, the particles are separated from each other without direct contact between them as shown in FIG. 2A. The energy density that the particles can carry, U, can be calculated from the dielectric particles constant $\varepsilon r$, and the electric field E applied.

For example, experimentally it was proved that macroporous gel particles of sulfonated polystyrene-divinylbenzene containing sulfuric acid at 4%, having a 600 µm diameter present $\varepsilon_r = 1.10 \times 10^8$ (measured at 100 Hz) which for an electric field applied to 30 kV implies a stored energy density of 437 kJ m$^{-1}$. These same particles, when shot on a metal surface, produce an electric discharge that carries out a work on the surface. For example, when they are shot on a stainless-steel surface 316 they produce a detectable passage of current and a noticeable modification of the surface.

This mechanism is favored by particles having a high dielectric constant and voltages applied that allow a greater density of stored electric energy and a high separation of particles that prevent that they are discharged between them.

The mechanism of transmission of electric charge by electric conductivity by contact is favored in conditions in which a particle's continuous contact is established from the electric source to the surface to be treated as shown in FIG. 2B. In this case, an electric current is directly established through the particles, that is why this mechanism is favored by particles having a high electric conductivity and high flow compaction. This mechanism comparatively produces high current intensities that allow the treatment of the part with higher speed.

The mechanism of electric charge transmission by discharges and voltaic arches implies the transmission of electric charge from the electric source to the part through the particles and the medium between particles. That means, the transmission of electric charge occurs, at least in part, through ionized gas. There exists a range of possibilities that include avalanche type discharges and crown type discharges.

Although these discharges can produce electro-particle and particle-surface, they mainly occur between particles. This implies that the medium between particles and the distance between particles are parameters having a great influence to trigger this mechanism.

For each type and size of particle there is a range of distances between particles in which this mechanism is triggered. To increase the conductivity of the space between particles increases the range of functional distances and allows a larger operation margin. In a preferred embodiment, an element is added that favors the conductivity between the particles by means of voltaic arches as shown in FIG. 2C. These elements can be solid, liquid, ions, etc. as well as the use of electromagnetic radiation.

In the event that the liquid elements that favor the conductivity among particles by means of voltaic arches, those having the capacity of generating micro-drops or aerosols stand out, they increase the conductivity of the medium between particles. Solid elements also exist that favor the conductivity between particles by means of voltaic arches that, due to the electric transmission generate micro particles or nano-particles in suspension such as, for example, derivates from carbon, carbon fibers type, graphite or micronized carbon. Due to the passage of the electricity, these compounds of carbon rise their temperature and generate volatile elements or elements in suspension that favor the electric transmission. It is also possible to add elements that favor the conductivity between particles by means of voltaic arches having the capacity to withhold electrolytic liquid, such as for example gel type material, with some sizes significantly larger than the particle average diameter, such as for example bars or cylinders to make electric bridges.

Ions generation in the space between particles significantly increases the conductivity between the particles by means of voltaic arches. It is possible to generate ions by means of ionizable or volatile substances, such as for example iodine, or by means of the use of electromagnetic radiation, either ionizing or not. These different elements that increase the conductivity of the space between particles can be used in combination to each other. They can be used mixed with the electrically active particles, be added at another point to condition the medium or they can be incorporated in the electrically active particles. Preferably, the particles can retain a giver amount of liquid, in this case, the vibrations and frictions of the process generate micro-drops and aerosols between the particles, which modify the system conductivity. It is also possible to use ultrasounds to generate micro-drops or nebulizing systems. The use of electromagnetic radiation can increase the conductivity of the medium. The use of ionizing electromagnetic radiation, that means ultraviolet, X-rays and y-rays, directly generates ions in the medium that increases the conductivity of the set of particles and gas to each other. It is also possible to use electromagnetic non-ionizing radiation to increase the conductivity. For example, by means of the use of microwaves radiation it is possible to generate plasmas out of particles that increase the conductivity of the medium.

The electric discharges occur more easily with AC than with DC. For example, experimentally, visible voltaic arches are seen using DC from 25 kV on. In identical conditions, using AC at 50 Hz, voltaic arches are seen at a voltage having an order of magnitude lower than 2 kV.

To maintain a stable current flow with crown type arches, the frequency of the AC can be increased, even several orders of magnitude, operating with voltages of the order of kilovolts, as well as to reduce the pressure of the medium.

The electric source provides electric energy to the solid particles. The electric current applied by the electric source can be AC, DC or pulsed current. Preferably, the electric source includes a system allowing to control the voltage and intensity applied. The DC is the current that produces the speediest effects on the surface, therefore in particles/surface systems that do not accumulate residues during the process, it is the preferred option. If the system with DC produces superficial accumulations, it is possible to improve the results using current that contains polarity reversal. The most affordable manner to obtain current with polarity reversals is to use AC. It can be used directly or rectified by means of diodes or other electroactive elements. A preferred alternative is the use of an electric source of pulsed current that allows to control the parameters of pulses applied, such as for example positive or negative voltages, positive or negative pulses duration, pauses duration etc.

The electric parameters applied by the electric source determine the effects of the particles on the surface. The difference of potential applied to produce the polishing effect stands on a large range from 1 V to 50 kV and it is a feature that determines the electric transmission mechanism. The current applied to the electrode can be DC, AC or pulsed current. For example, a DC source at 30 kV with a pulsed shooting and not compact of particles by gravity, at a distance of 18 cm between electrode and surface to be treated produce polishing effect on the metal surface. Also, for example, a DC source at 30 V, with a shooting of particles by gravity, compact and continuous, at a distance of 2 cm between electrode and surface to be treated produces polishing effects on the metal surface. Such as for example also, a 50 Hz AC source at 2 kV, with a pulsed shooting impelled by pressurized air at 5 bar, at a distance of 18 cm between electrode and surface to be treated produces visible electric arches and polishing effects on the metal surface. It is possible to allocate in a qualitative manner to each of these examples a greater proportion relative to each of the mechanisms of transmission of electric charge explained before.

The electrode is a conductive element electrically connected to the electric source with which the particles contact before exiting shot towards the surface to be treated. The shape of the exiting electrode depends on the application or surface to be treated. In general, it is sought to maximize the area of contact of the particles with the electrode in the moments prior to shooting them. For example, a duct through which the particles circulate is connected to an exit metal electrode, for example of copper, in the shape of a straightening cylinder. Such as for example, also to treat relatively flat plates or surfaces, the exit electrode can be a "curtain" system of application of the particles, that means a linear exit groove. In a preferred embodiment, the electrode consists of the nozzle.

The electrically active solid particles can transmit electric charge from the electric source to the metal surface to be treated.

Preferably, the solid particles can retain liquid. This retained liquid can partly dissolve the rusts and salts formed due to the passage of electric current, which improves the surface cleanliness. Preferably, the electrically active solid particles are manufactured in a polymer gel, as it offers a compromise between the physical integrity and the capacity to retain liquid in its structure. Preferably, the electrically active particles are of sulfonated poly styrene-divinylbenzene gel because they favor the process because of their reversible capacity to retain dissolved metal ions. Preferably, the liquid retained in the electrically active particles is an acid aqueous solution because most of the rusts, hydroxide and metal salts are more soluble in an acid medium. Preferably, the acid aqueous solution includes one or more strong acids ($pK_a<2$) due to their greater dissociation they increase the electric transmission while they improve the solubility of rusts, hydroxides and metal salts, which results in a best surface cleanliness.

The process of transmission of electric charge can generate a redox reaction on the metal surface, that can generate the formation of metal rusts on the surface. For a good surface finish, the controlled removal of the rusts formed is essential. Such surface rusts can be removed, for example, by means of an abrasive action or dissolving action.

The removal of the metal rusts from the surface by means of an abrasive action can occur by the action of the same electrically active particles that act as abrasive particles. The rusts can also be removed by the action of the non-electrically active abrasive particles. The action of the abrasive particles can be carried out simultaneously (abrasive particles and non-abrasive particles are shot at the same time) or consecutively to the action of electrically active particles. With this configuration, it would be dealt with a novelty process of dry electropolishing combined with a sanding type abrasive process.

Alternatively, or complementarily, the removal of the surface rusts can be carried out by means of a dissolving action. The dissolving action can be carried out by a liquid free or by a liquid retained in the particles. Preferably, the dissolving action is carried out by liquid retained in the electrically active particles to produce the dissolution of the rusts in the same stage when they are formed.

The shot of particles on the metal surface requires an impulse force. In the simplest version, such impulse is the tierce of gravity, Preferably, this impulse is provided by a controllable element. Such controllable element is preferably the impulse of a compressed gas. The use of a pressurized gas allows to control the speed and pressure of particle-surface contact, as well as to have the control on the particles flow and compaction.

In an alternative embodiment, the particles are shot on the metal surface by means of the impulse of a turbine that impels the particles by means of the centrifugal force.

In an alternative embodiment, the particles are shot on the metal surface in a discontinuous manner by means of the impulse of a rod and crank system. This allows shooting the particles in a discontinuous manner with a highly configurable system as for speed and volume of each shot.

In an alternative embodiment, the particles are shot on the metal surface in a continuous manner by means of the impulse of an endless screw. This allows to create a continuous and compact flow of particles, favoring the mechanism of electric transmission by contact.

The exiting flow of the particles through the nozzle can be controlled by means of valves and timers to make it continuous or pulsed.

The manner of shooting the particles on the surface can be adapted to the needs of the part to be treated. For example, in the event of being willing to process a flat surface within a production chain, a nozzle can be used that allows shooting the particles in a curtain shape on the surface that allows to cover the full width of the surface of the part that is moving under the curtain.

In an alternative embodiment, shooting can be carried out using an application hose-shaped nozzle through which the impelled particles would exit. Such application hoses can be configurable, for example as for the direction or size of the exiting needle.

Such hoses can be moved in an automated manner, for example within a shooting cabin or they can be used by hand against the surface to be treated. In the event that the shooting of particles occurs by means of compressed gas, these hoses can incorporate at their final section an air dissipator element at the particles point of delivery to compact the particles and maintain a high conductivity.

The particles flow exit through the nozzle can be controlled by means of valves and timers to make it continuous or pulsed.

The manner of shooting the particles on the surface can be adapted to the needs of the part to be polished. For example, in the event of being willing to process a flat surface within a production chain, a nozzle can be used that allows shooting particles in the shape of a curtain on the surface that allows to cover the width of the surface of the part that is moving under the curtain.

In an alternative embodiment, the shooting can be carried out using an application hose-shaped nozzle through which the particles should exit impelled. Such application hoses can be configurable for example as for the direction or size of the exit needle. Such hoses can be moved in an automated manner, for example within a shooting cabin or they can be used by hand against the surface to be polished. In the event that the shooting of the particles occurs by means of compressed gas, these hoses can incorporate at their final length an air dissipator element at the particles delivery point to compact the particle and maintain a high conductivity.

The surface to be treated can be isolated, be connected to a grounding or to the electric source. Preferably, the surface to be treated is connected to an electrode of the electric source. This way, a greater control of the difference of the potential applied is achieved and it is possible to measure the passing current between the particles exit electrode and the surface to be treated.

The surface to be treated must be conductive. Preferably, the surface to be treated is metallic. This includes parts of plastic materials having a surface that has been metallized. The metals and alloys that can be treated include, but are not limited to any type of irons, steels, chrome-cobalt alloys, nickel and nickel alloys, such as nitinol, zinc and zinc alloys, such as Zamak, aluminum and alloys, titanium and alloys, copper and alloys, tungsten carbide, etc.

The versatility of this system makes that large flat surfaces, large-sized parts, unmovable surfaces, such as building structures, etc. can be treated.

The electric parameters applied to the electric source determine the effects of the particles on the surface. The difference of potential applied to produce polishing effects is within a large range from 1V to 50 kV and it is a feature that determines the electric transmission mechanism. The current applied to the electrode can be DC, AC or pulsed current. For example, a DC source at 30 kV, with a pulsed and no compact shooting of particles by gravity, at a distance of 18 cm between electrode and surface to be treated, produces polishing effects on the metal surface. Such as for example also, a DC source at 30 V, with a compact and continuous shooting of particles by gravity, at a distance of 2 cm between electrode and surface to be treated produces polishing effects on the metal surface. Such as for example, also, a 50 Hz AC source at 2 kV, with a pulsed and no compact shooting of particle by gravity and impelled by air at 5 bar, at a distance of 18 cm between electrode and surface to be treated produces visible electric arches and polishing effects on the metal surface. It is possible to allocate in a qualitative manner to each of these examples a greater relative proportion of each of the formerly explained electric charge transmission mechanisms.

The active electrically solid particles can transmit electric charge from the electric source to the metal surface to be treated. Preferably, the solid particles can retain liquid. This liquid retained can dissolve in part the rusts and salts formed due to the passage of electric current, which improves the surface cleanliness. Preferably, the electrically active solid particle is made of a polymer gel as it offers a compromise between the physical integrity and the capacity to retain liquid in its structure. Preferably, the electrically active particles are of sulfonated polystyrene-divinyibenzene gel because it favors the process due to its reversible capacity to retain dissolved metal ions. Preferably, the liquid retained in the electrically active particles is an acid aqueous solution because most of the rusts, hydroxide and metal salts are more soluble in an acid medium. Preferably, the acid aqueous solution includes one or more strong acids ($pK_a < 2$) due to their greater dissociation, they increase the electric transmission while they improve the solubility of rusts, hydroxides and metal salts, which results in a best surface cleanliness.

Other elements that improve the operation of the invention are:

A delivery deposit where particles are stored before being charged.

A collector of the particles. The collector and the delivery deposit can be the same element.

A particles recirculating system from the collector to the delivery deposit, in the case they are not the same element.

Vibrators at the points of storage or circulation of the particles to facilitate their carriage as well as transmitting vibration to the surface to be treated.

Preferably, the device comprises a solid particles delivery deposit prior to the electric contact and shooting. Such deposit ensures the delivery of particles to the system in a constant manner and avoids moments of stoppage.

Preferably, the device comprises a solid particles collector after the particles impacted against the surface to be treated. Such collector is designed for each embodiment in a specific manner and can adopt several shapes, as it can be seen in the examples. This element prevents the dispersion of the particles everywhere while it allows the particles recirculation.

In the embodiments allowing it, preferably the delivery deposit and the collector are the same element. This allows to simplify the design of the device and prevents redundancy of elements, which results in lower costs but maintaining the same functionality.

In case that the delivery deposit and the collector are not the same element, a particle recirculating system can exist between the solid particles collector and the delivery deposit. This system allows to automatically re-use particles, preventing thus the human effort necessary and improving in automation level.

The device preferably comprises a vibrator or vibrators that make the particles to vibrate to facilitate their movement. The said vibrator can be preferably located in the delivery deposit and/or in the collector. The movement of a granular material, as the particles used in this process are, can form blockages by means of arches. The use of vibrators in the deposits and circulation ducts significantly reduces arch forming which prevent blockages in the circulation points.

Consequently, the following steps are identified that improve the method object of this invention, they are:

Recirculation of particles from the collector to the delivery deposit, in case they are not the same element.

Vibration of the electrically active solid particles.

This novel technology facilitates a large variety of possible final applications. For example, purpose and without the aim of limitation, some of the applications are presented. An application is in polishing individual units to treat large structural parts such as a wing of an aircraft to improve its aerodynamics. A final application is its use in continuous in line processes to treat metal surfaces after their production or as a prior step to other treatments.

Another application is a polishing of stand-alone portable devices.

DETAILED DESCRIPTION

Disclosed hereafter are several example cases of surface treatment. The examples are in no way intended to limit the scope of the invention.

Embodiment 1

Figure 1:
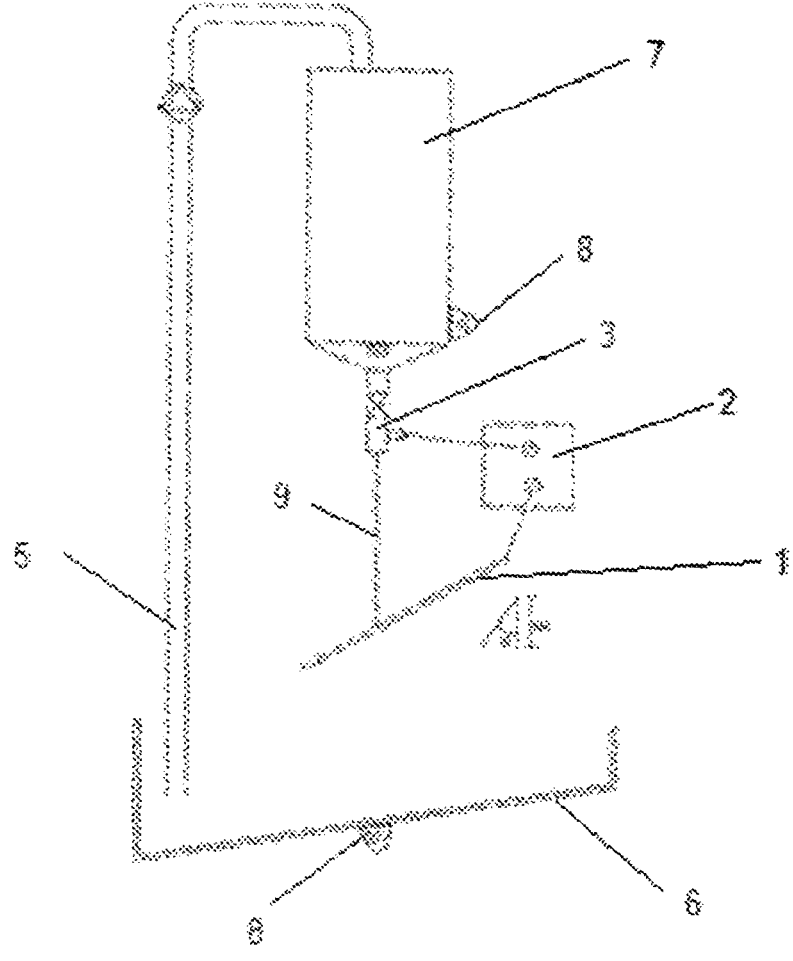
FIG. 1 shows a system for implementing a polishing method according to one embodiment.
Figure 2:
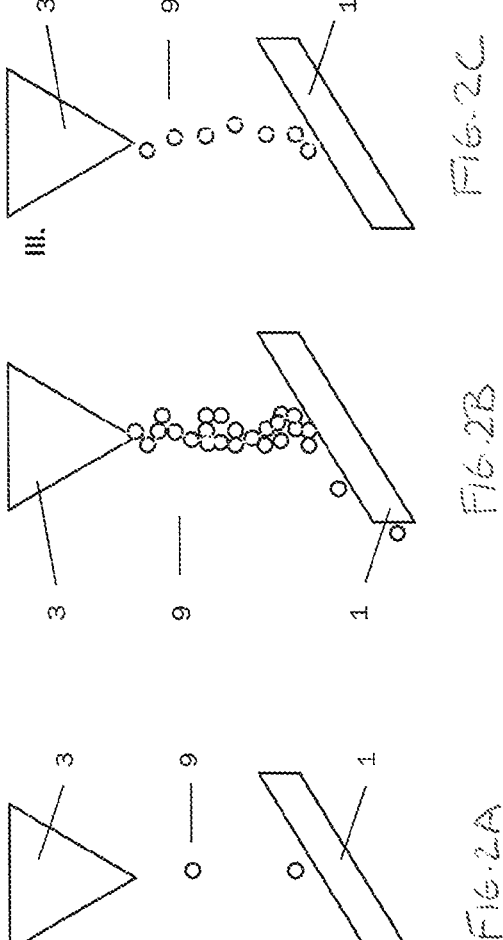
FIG. 2A shows a mechanism of transmission of the electricity between the electric source and the metal surface by means of net charge of the particles.
FIG. 2B shows a mechanism of transmission of the electricity between the electric source and the metal surface by means of electric conductivity by contact.
FIG. 2C shows a mechanism of transmission of the electricity between the electric source and the metal surface by means of electric conductivity by means of voltaic arches.

The device comprises a particles 9 delivery deposit 7 the exit of which is connected to a copper duct acting as electrode 3, in turn connected to an electric source 2. The particles 9 fall by gravity in a continuous manner down to the surface to be treated 1 which is connected to the electric source 2 through the counter electrode. The particles 9 fall, with prior contact with the part, down a collector 6 for their later recirculation by means of a recirculation system 5. As well the particles delivery deposit 7 as the collector 6 has a vibrator 8 available. A schematic representation can be seen in FIG. 1.

In an exemplary case, the particles (9) used are microporous gel particles of sulfonated polystyrene-divinylbenzene charged with an electrolyte solution that contains sulfuric acid at 4%. This prototype has been proved with different types of electric current: DC of 1 to 60 V; 50 Hz to 50,000 Hz at 0 to 220 V.

With these parameters, the polishing method for treatment of a steel 316 surface has been proved with different types of electric current: DC up to 35 kV, 50 Hz AC up to 15 kV.

The results of DC show a linear performance of the intensity with respect to the difference of potential. It is observed that after a treatment of 5 min effective at 30 kV, there is a reduction of the $R_a$ of 0.37 to 0.34 μm in the area more exposed to the particles flow.

The results using AC at 50 Hz show a linear performance within the range of 0 to 5 kV. Increasing the voltage from that point does not produce an increase of the proportional intensity. This effect clearly indicates a change of mechanism in the transmission of the electric charge.

Device for the Treatment of in Line Surfaces

Figure 3:
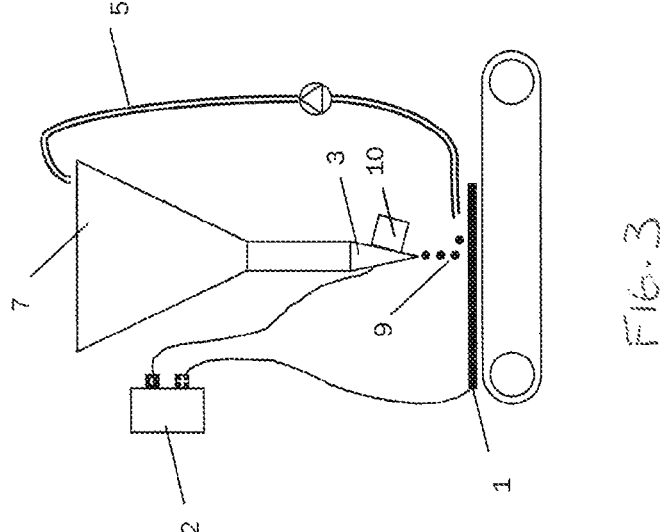
FIG. 3 shows a system for in line surface treatment.

It consists of a device for in-line surface treatment. A schematic representation appears in the FIG. 3 that shows the device designed to treat metal plates. The device includes an electric source 3, a "curtain" system of application of particles 9, carrying system of the plate to be treated and a recirculation system 5 that collects the particles and deposits them in the delivery deposit 7.

The metal plate to be treated is located on a conveyor belt provided with vibration and connected to the electric source. At a point of the path of the conveyor belt there is a curtain-like particles shooter 9. The linear applicator produces a lineal shooting of particles 9 on the surface to be treated 1 that covers the full width of the plate that is sought to be treated. The plate moves through the curtain of particles at a suitable speed that provides it the time of treatment to obtain the expected finishes. Although not shown in FIG. 3, like the system of FIG. 1, the curtain-type particles shooter includes a vibrator 8 coupled to the delivery deposit to facilitate particle flow. In the slot of the particles exit there is a metal element, connected to the negative pole of the supply source that acts as electrode 3. The particles contact the electrode 3 before arriving on the surface to be treated 1. Close to the contact point a recirculation system 5 is applied that sucks the particles after they contact with the surface and deposit them in the delivery deposit 7.

Portable Device for Surfaces Treatment

Figure 4:
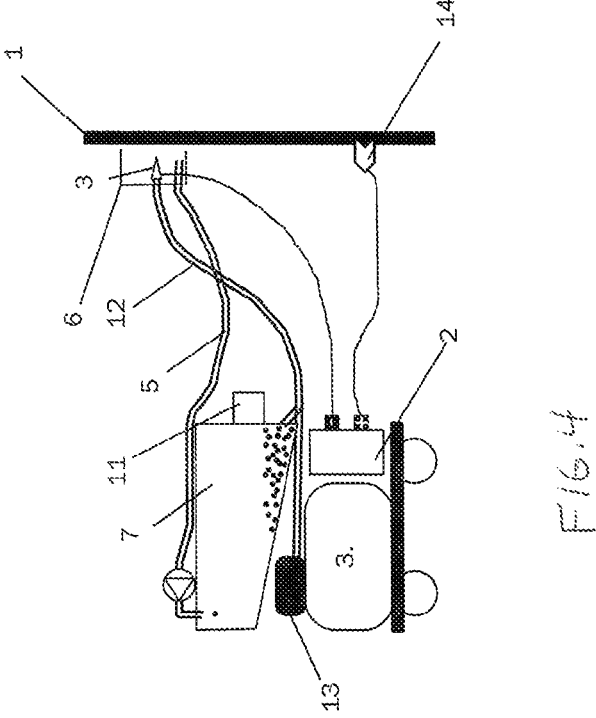
FIG. 4 shows an outline of a portable device for surface treatment.

It consists in a portable device for surfaces treatment 1. A schematic representation appears in FIG. 4. This device facilitates the joint carriage, such as, for example, with wheels.

The device includes a compressor and a pressurized air deposit, an electric source 2, a delivery deposit 7 of particles and a recirculation system 5.

The device can be connected to a plug, alternatively it can include a storage battery sufficient to provide the energy. The delivery deposit 7 of the particles 9 is located in a lower part and has an exit towards the particles delivery hose, the delivery deposit 7 can be provided with a vibrator 11 to facilitate the flow of particles 9. The particles 9 are propelled through the application hose 12 by means of compressed air coming from the compressor 13. The pressure necessary depends on the length and location of the application hose, a pressure between 3 and 10 bar provides good results. The application hose ends in a diffuser that allows the exit of part of the air, forcing the particles 9 to in contact with the treatment surface. The exit of the particles occurs through or in contact with an electrode 3 that can be an element of, for example, copper, stainless steel 316 or irradiated titanium, connected to the electric source 2, preferably to the negative pole, preferably with an ammeter for the control of the intensity. The application electrode 3 is located at a distance between 0.5 and 10 cm from the surface being treated, so that between the electrode and the surface there is a flow of particles to produce the passage of current. The final part of the exit of the particles is included within a collecting collector 6 that is located very close to or in contact with the surface to be treated 1. The particles collecting collector 6 is connected to a recirculation system 5 that comprises a second hose provided with suction that collects the particles from the collector 6 after their contact with the surface and delivers them newly to the particles delivery deposit 7. The surface to be treated 1 is preferably connected to the positive pole of the electric source 1 and by means an electric clamp 14. In order a worker polish non-accessible surfaces or to improve the accuracy, the system can include the use of a robotized arm.

The design of the system is figured out to occupy a compact volume and it contains elements, such as for example wheels or sliding elements that make them mobile.

The current applied depends on the composition of the surface to be treated and of the particles 9 used. For example, to treat a steel 316 surface, good results are achieved using particles of sulfonated polystyrene-divinyl-benzene containing sulfuric acid at 4% with a DC of 12 V.

Device for the Treatment of Surfaces in Cabin

Figure 5:
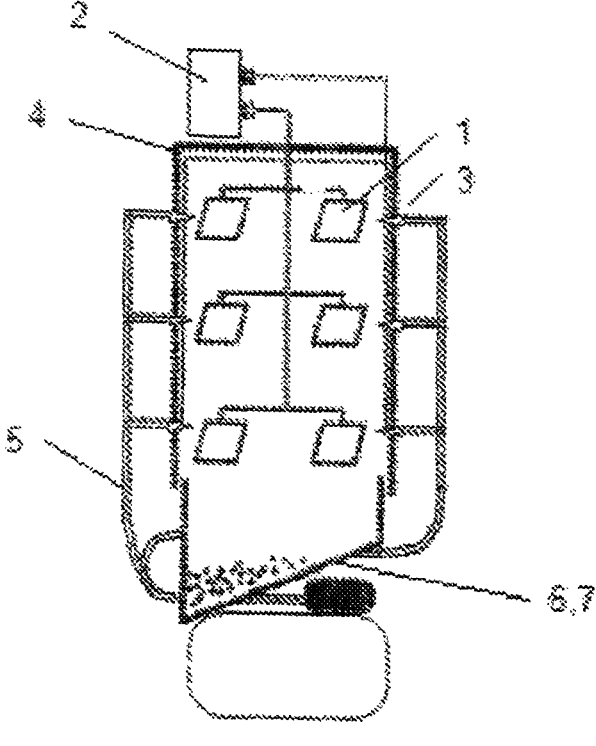
FIG. 5 shows a surface treatment system incorporated inside a cabin.

It consists of a device for the treatment of surfaces 1 in a closed cabin 4. A schematic representation can be seen in FIG. 5. The device includes an electric source 2, one or several exit ports of electrically active particles 9 with a plurality of electrodes 3, a system for anchoring the parts to be polished, a closed cabin 4 for the treatment and a recirculation system 5 that sucks/retrieves the particles from the collector 6, that in this example also acts as delivery deposit 7, and delivers the particles towards the exit ports that are directed towards the treatment surfaces.

The metallic parts to be polished are placed on frames within the cabin by means of suitable anchorages, so that they are connected to the electric source 2. The cabin 4 is provided with several exits of particles connected at their final section to electrodes 3. Shooting the particles 9 occurs by means of the use of compressed air, preferably within a range of 2 to 10 Bar, preferably between 4 and 6 bar.

The bottom of the cabin 4 that acts as collector 6, and thereafter as a delivery deposit 7 has a slope and the particles 9 are collected by a recirculation system (5) that carries them to the exits of particles.

The electric current applied depends on several factors such as of the type of material, the total area to be processed, the distance between the point of exit of the particles and the surface.

Additional embodiments are comprised in the following clauses.

Clause 1. Method for dry treatment of metal surfaces (1) by means of electrically active solid particles (9), the method comprising:

Contact of the particles (9) with the electrode (3) of an electric source (2).

Shooting of the particles (9) towards the metal surface to be treated.

Transmission of electric charge of the particles to the metal surface to be treated.

Clause 2. Method for dry treatment of metal surfaces (1) by means of electrically active solid particles (9) according to the clause 1, wherein the transmission of electricity between the electric source (2) and the metal surface (1) during the shooting step is by net charge of the particles (9).

Clause 3. Method for dry treatment of metal surfaces (1) by means of electrically active solid particles (9) according to the clause 1, wherein the transmission of the electricity between the electric source (2) and the metal surface (1) during the shooting step is by electric conductivity by contact.

Clause 4. Method for dry treatment of metal surfaces (1) by means of electrically active solid particles (9) according to the clause 1, wherein the transmission of electricity between the electric source (2) and the metal surface (1) during the shooting step is by electric conductivity by means of voltaic arches.

Clause 5. Method for dry treatment of metal surfaces (1) by means of electrically active solid particles (9) according to any of the preceding clauses, wherein the current that is applied to the electrode is a DC.

Clause 6. Method for dry treatment of metal surfaces (1) by means of electrically active solid particles (9) according to any of the preceding clauses 1-4, wherein the current applied to the electrode (3) is a current that contains positive sections and negative sections.

Clause 7. Method for dry treatment of metal surfaces (1) by means of electrically active solid particles (9) according to the clause 4, wherein in the medium between the particles (9) there exists a conductive element that increases the conductivity between the particles by means of voltaic arches.

Clause 8. Method for dry treatment of metal surfaces (1) means of electrically active solid particles (9) according to the clause 7, wherein the element that favors the conductivity between the particles (9) by means of voltaic arches is a derivate of carbon, iodine, talc, cylinders and/or bars of gel.

Clause 9. Method for dry treatment of metal surfaces (1) by means of electrically active solid particles (9) according to the clause 7, wherein the element that favors the conductivity between the particles (9) by means of voltaic arches is a source of ionizing radiation (ultraviolet, X-rays and y-rays), a non-ionzing source of radiation (microwaves), a nebulizer and generator of aerosol and/or an ultrasounds source.

Clause 10. Method for dry treatment of metal surfaces (1) by means of electrically active solid particles (0) according to any of the preceding clauses, wherein it comprises a step of use of abrasive particles, simultaneously or consecutively to the electrically active particles.

Clause 11. Device for dry treatment of metal surfaces (1) by means of electrically active solid particles (9), wherein it comprises an electric source (2) with an electrode (3) that transmits electric charge to the electrically active solid the particles (9) and means for shooting electrically active solid particles on the surface to be treated (1).

Clause 12. Device for dry treatment of metal surfaces (1) means of electrically active solid particles (9) according to clause 11, wherein the electric: source (2) is connected to the surface to be treated (1) closing thus the electric circuit.

Clause 13. Device for dry treatment of metal surfaces (1) by means of electrically active solid particles (9) according to any of the clauses 11-12, wherein propelling the electrically active solid particles (9) is carried out only by the force of gravity.

Clause 14. Device for dry treatment of metal surfaces (1) by means of electrically active solid particles (9) according to any of the clauses 11-12, wherein propelling the electrically active solid particles (9) is carried out by means of a centrifugal system.

Clause 15. Device for dry treatment of metal surfaces (1) by means of electrically active solid particles (9) according to any of the clauses 11-12, wherein propelling the electrically active solid particles (9) is carried out by means of compressed gas.

Clause 16. Device for dry treatment of metal surfaces (1) by means of electrically active solid particles (9) according to any of the clauses 11-12, wherein propelling the electrically active solid particles (2) is cared out by means of a rod and crank system or an endless screw system.

Clause 17. Device for dry treatment of metal surfaces (1) by means of electrically active solid particles (9) according to any of the clauses 11-16, wherein it forms part of an in-line assembly.

Clause 18. Device for dry treatment of metal surfaces (1) by means of electrically active solid particles (9) according to any of the clauses 1-16, wherein it is a portable system.

Clause 19. Device for dry treatment of metal surfaces (1) by means of electrically active solid particles (9) according to any of the clauses 11-16, wherein the device and the surface to be treated (1) are within a cabin (4).

Clause 20. Device for dry treatment of metal surfaces (1) by means of electrically active solid particles (9) according to any of the clauses 11-19, wherein the device comprises a delivery deposit (7) of solid particles (9) previously to the contact with the electrode (3).

Clause 21. Device for dry treatment of metal surfaces (1) by means of electrically actin e solid particles (9) according to any of the clauses 11-20, wherein the device comprises a collector (6) of solid particles (9) after the have collided against the surface to be treated (1).

Clause 22. Device for dry treatment of metal surfaces (1) by means of electrically active solid particles (9) according to the clause 20, wherein the device comprises a recirculation system (5) of particles (9) from the collector (6) of solid particles to the delivery deposit (7).

Clause 23. Device for dry treatment of metal surfaces (1) by means of electrically active solid particles (9) according to any of the clauses 11-22, wherein the device comprises a vibrator (8).

Clause 24. Device for dry treatment of metal surfaces (1) by means of electrically active solid particles (9) according to any of the clauses 11-23, wherein the deposit of exit of the particles comprises a diffuser.

What is claimed is:
1. A method for treatment of a metal surface, the method comprising:
placing a plurality of electrically active solid particles in contact with an electrode that is connected to a first pole of an electric source and thereafter shooting the plurality of electrically active solid particles towards the metal surface that is connected to a second pole of the electric source so that the plurality of electrically active solid particles contact and transmit to the metal surface electricity, the plurality of electrically active solid particles comprising microporous gel particles of sulfonated polystyrene-divinylbenzene structure:
wherein the shooting of the plurality of electrically active solid particles includes creating a chain of electrically active solid particles that extends between the electrode and the metal surface,
neighboring solid particles in the chain of electrically active solid particles being electrically connected and separated by a medium that provides electrical conductivity between the neighboring solid particles, the medium comprising solid or liquid elements suspended in a gas; and
treating the metal surface with the plurality of electrically active solid particles.

2. The method for treatment of a metal surface according to claim 1, wherein the transmission of electricity between the electric source and the metal surface during the shooting of the plurality of electrically active solid particles is by net charge of the plurality of electrically active solid particles.

3. The method for treatment of a metal surface according to claim 1, wherein a direct current (DC) is applied to the electrode.

4. The method for treatment of a metal surface according to claim 1, wherein a current is applied to the electrode, the current containing positive sections and negative sections.

5. The method for treatment of a metal surface according to claim 1, wherein the medium is selected from the group consisting of a carbon, iodine, and talc.

6. The method for treatment of a metal surface according to claim 1, further comprising treating the metal surface with abrasive particles, simultaneously or consecutively to shooting the plurality of electrically active solid particles towards the metal surface.

7. The method for treatment of a metal surface according to claim 1, wherein the microporous gel particles of sulfonated polystyrene-divinylbenzene contain sulfuric acid.

8. The method for treatment of a metal surface according to claim 1, wherein the liquid elements are liquid microdrops.

9. The method for treatment of a metal surface according to claim 1, wherein the solid elements are microparticles or nanoparticles.

10. The method for treatment of a metal surface according to claim 9, wherein the microparticles or nanoparticles comprise carbon.

* * * * *